United States Patent [19]

Bothe et al.

[11] Patent Number: 4,863,032
[45] Date of Patent: Sep. 5, 1989

[54] PACKAGING WRAPPER FOR DISK-SHAPED MAGNETIC INFORMATION CARRIERS

[75] Inventors: Lothar Bothe, Mainz-Gonsenheim; Gunter Schloegl, Kelkheim; Guenther Crass, Taunusstein, all of Fed. Rep. of Germany

[73] Assignee: Hoechst Aktiengesellschaft, Frankfurt am Main, Fed. Rep. of Germany

[21] Appl. No.: 167,179

[22] Filed: Mar. 11, 1988

[30] Foreign Application Priority Data

Mar. 14, 1987 [DE] Fed. Rep. of Germany ... 8703847[U]

[51] Int. Cl.$^4$ ............................................. B65D 85/30
[52] U.S. Cl. .................................. 206/444; 206/312; 206/484; 428/35.8
[58] Field of Search ............... 206/312, 313, 328, 331, 206/444, 484; 428/35.8, 35.9, 36.4

[56] References Cited

U.S. PATENT DOCUMENTS

| | | | |
|---|---|---|---|
| 911,794 | 2/1909 | Williams | 206/312 |
| 3,224,573 | 12/1965 | Way | 206/313 |
| 3,426,960 | 2/1969 | Shore | 206/312 |
| 3,430,375 | 10/1966 | Worthington, III | 206/312 |
| 4,082,877 | 4/1978 | Shadle | 206/819 |
| 4,238,030 | 12/1980 | Maylandt | 206/313 |
| 4,303,708 | 12/1981 | Gebhardt et al. | 428/35 |
| 4,337,284 | 6/1982 | Cooper et al. | 206/605 |
| 4,762,225 | 8/1988 | Henkel | 206/444 |
| 4,769,263 | 9/1988 | Bitter | 428/35.8 |
| 4,792,042 | 12/1988 | Koehn et al. | 428/35.8 |

FOREIGN PATENT DOCUMENTS 3425990  1/1986  Fed. Rep. of Germany ...... 206/313

Primary Examiner—David T. Fidei
Attorney, Agent, or Firm—Foley & Lardner, Schwartz, Jeffery, Schwaab, Mack, Blumenthal & Evans

[57] ABSTRACT

A packaging wrapper for disk-shaped magnetic information carriers is disclosed. The wrapper is formed by folding over a blank to form a flat wrapper. The wrapper has projecting tabs jutting out laterally from the sides of the front wrapper wall and overlap zones on the rear wrapper wall formed as a result of folding-over of the projecting tabs. The projecting tabs are firmly bonded to the rear wrapper wall by means of welding. The blank for forming the packaging wrapper is formed from a biaxially oriented, opaque multi-ply film comprising a base layer consisting essentially of polypropylene and fillers. The fillers are present in a quantity in the range from 10 to 30% by weight, relative to the total weight of the polypropylene and fillers.

25 Claims, 1 Drawing Sheet

PACKAGING WRAPPER FOR DISK-SHAPED MAGNETIC INFORMATION CARRIERS

BACKGROUND OF THE INVENTION

The present invention relates to a substantially rectangular packaging wrapper of thermoplastic material for disk-shaped magnetic information carriers.

The simplest packaging wrappers for disk-shaped magnetic information carriers, so-called diskettes or floppy disks, intended for use in, for example, personal computers, are composed of paper. However, paper packaging wrappers disadvantageously have very unsatisfactory tear propagation resistance and therefore wear out very rapidly, especially when used frequently.

Attempts have therefore been made to overcome the defect of unsatisfactory tear propagation resistance by the use of synthetic paper based on polyethylene fiber mats. Due to their structure, however, these improved packaging wrappers have a fibrous appearance which is rather unappealing and is not very effective promotionally and, furthermore, their antistatic properties are still unsatisfactory.

Packaging wrappers have also been produced from polyethylene film. Such wrappers are, however, too easily stretched and still have disadvantageous antistatic properties.

SUMMARY OF THE INVENTION

It is therefore an object of the present invention to provide a packaging wrapper for magnetic information carriers, which has a very high tear propagation resistance.

It is a further object of the invention to provide a packaging wrapper for magnetic information carriers which has a very attractive visual appearance.

It is yet another object of the present invention to provide a packaging wrapper for magnetic information carriers that has excellent mechanical properties.

It is a further object of the present invention to provide a packaging wrapper for magnetic information carriers that has good antistatic properties.

These and other objects are achieved by a packaging wrapper of thermoplastic for disk-shaped magnetic information carriers formed from a blank, comprising a flat wrapper comprising a front wrapper wall, a rear wrapper wall, and a wrapper opening extending on one side along the entire edge of the wrapper, the front wrapper wall merging integrally into the rear wrapper wall in the region opposite the wrapper opening as a result of folding-over of the blank; projecting tabs jutting out laterally from the sides of the front wrapper wall; and overlap zones on the rear wrapper wall formed as a result of folding-over of the projecting tabs, the projecting tabs being firmly bonded to the rear wrapper wall by means of welding; wherein the blank for forming the packaging wrapper is formed from a biaxially oriented, opaque multi-ply film comprising a base layer consisting essentially of polypropylene and fillers, wherein the fillers are present in a quantity in the range from 5 to 30% by weight, relative to the total weight of the polypropylene and fillers.

Below, the invention will be explained in more detail by way of example, with reference to the figures.

FIG. 1 shows a perspective view, obliquely from above, of a packaging wrapper according to the invention. It will be clearly seen that projection 3 of the rear wrapper wall 2 protrudes beyond front wrapper wall 1 in the region of wrapper opening 4. Diametrically opposite wrapper opening 4, there is wrapper bottom region 5, where front wrapper wall 1 integrally merges into rear wrapper wall 2 as a result of folding-over and thus forms the bottom closure of the packaging wrapper. In the regions, close to the side edges, of rear wrapper wall 2, the position of overlap zones 6, where front wrapper wall 1 is joined to rear wrapper wall 2 by folding-over of projecting tabs 13, which jut out laterally from the front wrapper wall 1, is shown by broken lines.

In a greatly magnified illustration, FIG. 2 shows the layer sequence of the film forming the packaging wrapper. Base layer 7 is coated on both sides by transparent surface layers 8, 8' and has microcavities 9 which are caused by fillers and impart an opaque appearance to the packaging wrapper according to the invention. Surface layer 8', facing the inside of the packaging wrapper, carries metallization layer 10, and surface layer 8, facing the outside of the packaging wrapper, carries imprint 11 which is covered with protective film 12.

DESCRIPTION OF THE PREFERRED EMBODIMENTS

Figure 1:
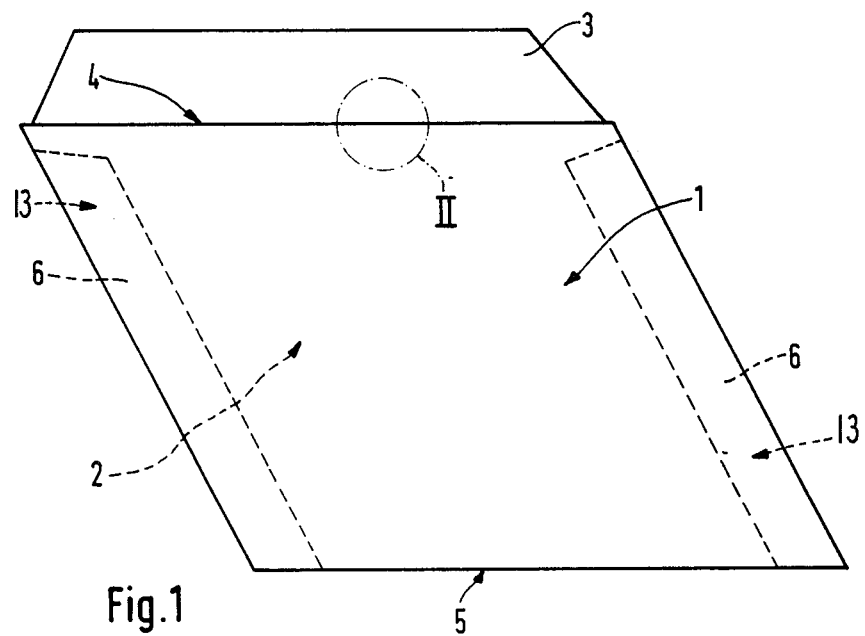
Figure 2:
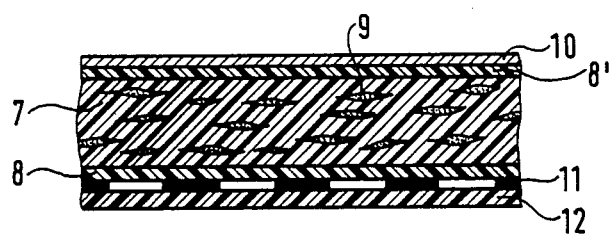

A flat wrapper with a wrapper opening extending on one side along the entire edge of the wrapper comprises a front wrapper wall and a rear wrapper wall. The front wrapper wall merges integrally into the rear wrapper wall in the wrapper bottom region opposite the wrapper opening as a result of folding-over of the blank forming the packaging wrapper. Overlap zones are present in the region, close to the side edges, of the rear wrapper wall as a result of folding-over of projecting tabs which jut out laterally from the front wrapper wall. In these zones the front wrapper wall is bonded with firm adhesion to the rear wrapper wall by means of welding. The blank forming the packaging wrapper is formed from a biaxially oriented, opaque multi-ply film comprising a base layer, essentially containing polypropylene and fillers in a quantity in the range from about 10 to 30% by weight, relative to the total weight of the polypropylene and the fillers, and surface layers arranged on both sides of the base layer.

In particular, the film forming the blank has a density in the range from about 0.4 to 0.9 g/cm$^3$, and the filler used has a mean particle size from about 2 to 5 $\mu$m.

The packaging wrapper according to the invention is preferably rectangularly shaped and has an edge length in the range from about 7 to 22 cm, preferably from about 13 to 22 cm, the edge length being measured at the wrapper opening or at the wrapper bottom region arranged parallel thereto. The side edges of the packaging wrapper are preferably of shorter length than the edges of the wrapper bottom region or of the wrapper opening, and the disk-shaped information carrier, which in turn is arranged in a firmly closed square protective envelope, partially projects by this protective envelope from the wrapper opening of the packaging wrapper according to the invention. The overlap zones in the two regions, close to the side edges, of the rear wrapper wall usually having a width of up to a few centimeters, preferably from about 0.5 to 3 cm. In the overlap zones, the folded-over projecting tabs, jutting out from the front wrapper wall, are joined to the rear wrapper wall by sealing, gluing or welding. In a preferred embodiment, the rear wrapper wall is designed such that it projects beyond the wrapper opening. The insertion of the magnetic information carrier, provided with the protective envelope, into the packaging wrapper is facilitated by this projection of the rear wrapper wall beyond the wrapper opening. The projection has a length of a few centimeters, preferably from about 1 to 5 cm, and can, if desired, be designed such that it tapers upwards.

The blank forming the packaging wrapper is preferably composed of an opaque, low-density film produced by co-extrusion, coated on one or both sides and successively stretched in the longitudinal direction at a temperature from about 120° to 130° C. and in the transverse direction at a temperature from about 160° to 170° C. The film containing the indicated filler quantities is stretched relatively extensively, in particular successively by about 5 to 7 times in the longitudinal direction and by about 8 to 10 times in the transverse direction. Preferably, the quantity of filler, relative to the total weight of polypropylene and filler, is about 16 to 27% by weight and the filler used has a mean particle size from about 3 to 4 $\mu$m.

In particular, the film has a density from about 0.4 to 0.7 and preferably from about 0.4 to 0.6 g/cm$^3$. Its thickness is about 20 to 120 $\mu$m, preferably about 40 to 80 $\mu$m, and the thickness of the coating represents only a small share in the total thickness of the film and expediently is about 0.1 to 10 $\mu$m. In a preferred embodiment, the outer coating comprises sealable material.

The polypropylene of the base layer can be an isotactic homopolymer or copolymer of propylene with ethylene or alpha-olefins having 4 to 8 carbon atoms, or a mixture of propylene homopolymers and propylene copolymers. In the copolymers, the quantity of comonomer does in general not exceed about 10% by weight, relative to the copolymer. Preferred comonomers are ethylene and butene-1. The polymer of the base layer advantageously has a melt index in the range from about 0.5 g/10 minutes to 8 g/10 minutes at 230° C. and 2.16 kp loading (DIN 53735), especially from about 1.5 g/10 minutes to 4 g/10 minutes.

The fillers are the conventional inorganic or organic pulverulent materials incompatible with polypropylene. Inorganic fillers are preferred. Suitable inorganic fillers include alumina, aluminum sulfate, barium sulfate, calcium carbonate, magnesium carbonate, silicates such as aluminum silicate (kaolin clay) and magnesium silicate (talc), silica and/or titanium dioxide, amongst which calcium carbonate, silica, titanium dioxide or mixtures thereof are preferred. Calcium carbonate (chalk) is particularly preferred. The quantity of filler is preferably about 16 to 30% by weight, especially about 16 to 27% by weight, relative to the weight of the polypropylene present. The mean particle size of the pulverulent filler is preferably in the range from about 3 to 4 $\mu$m, If appropriate, the base layer can contain suitable additives such as antioxidants, antistatics and/or stabilizers, each in an effective quantity.

The surface layers are as a rule heat-sealable or cold-sealable layers. They can also be non-sealable layers. All these layers are present on both sides. The heat-sealing layer is preferably composed of an ethylene homopolymer (high-density polyethylene or low-density polyethylene); of a copolymer of propylene as the main component and ethylene, preferably in a quantity not exceeding about 10% by weight (relative to the copolymer); of a copolymer of propylene as the main component and butene-1, preferably in a quantity from about 10 to 15% by weight (relative to the copolymer); or of a terpolymer of propylene, ethylene and an alpha-olefin having 4 to 10 carbon atoms, preferably a terpolymer of about 93.2 to 99.0% by weight of propylene, about 0.5 to 1.9% by weight of ethylene and about 0.5 to 4.9% by weight of an alpha-olefin having 4 to 10 carbon atoms, or of a mixture of these polymers. The comonomers are essentially in a random distribution in the polymers (cf. German Auslegeschrift No. 2,814,311). Suitable cold-sealing layers are composed of polymers based on a natural or synthetic rubber. The non-sealable surface layers are preferably composed of an appropriate propylene homopolymer. The thickness of the surface layers is in each case about 0.1 to 10 $\mu$m, preferably 0.5 to 2 $\mu$m.

Apart from the fillers necessary for producing the opaque appearance, the film can additionally also contain color pigments in quantities from about 0.01 to 2% by weight. This imparts to the packaging wrapper, according to the innovation, a metallic appearance which is particularly effective promotionally. With particular preference, about 0.04 to 1% by weight of carbon black particles are additionally incorporated into the base layer. The antistatic properties of the packaging wrapper according to the innovation are improved by the electric conductivity of the carbon black particles.

In a particularly preferred embodiment, the packaging wrapper according to the invention additionally carries a metallization layer on its inside, i.e., on each of the insides of both the front wrapper wall and the rear wrapper wall. The metalization layer is preferably applied by vacuum vapordeposition already to the film forming the packaging wrapper and is composed especially of aluminum. As a result of the metallization layer located in the interior of the packaging wrapper, the packaging wrapper according to the innovation can no longer be electrostatically charged when the magnetic information carrier is inserted, and therefore provides better protection for data stored in the magnetic form on the information carrier.

In a further preferred embodiment, the packaging wrapper according to the invention is provided with an imprint on its outside, i.e., on each of the outsides of the front wrapper wall and the rear wrapper wall. To improve the printability, the film forming the packaging wrapper can, if necessary, also be subjected to a corona discharge treatment during its production.

In a very particularly preferred embodiment, the packaging wrapper is provided on its inside with a metallization layer, carries an imprint on its outside and furthermore, to protect the imprint, is also coated on its outside with a transparent protective film over the imprint. The protective film can be composed of polyethylene or polypropylene, if desired.

What is claimed is:

1. A packaging wrapper of thermoplastic for disk-shaped magnetic information carriers formed from a blank, comprising;

a flat wrapper comprising a front wrapper wall, a rear wrapper wall, and a wrapper opening extending on one side along the entire edge of the wrapper, the front wrapper wall merging integrally into the rear wrapper wall in the region opposite the wrapper opening as a result of folding-over of the blank;

projecting tabs extending from the sides of the front wrapper wall; and overlapping zones on the rear wrapper wall formed as a result of folding-over of the projecting tabs, the projecting tabs being firmly bonded to the rear wrapper by means of welding;

wherein the blank for forming the packaging wrapper is formed from a biaxially oriented, opaque multi-ply film comprising a base layer consisting essentially of polypropylene and fillers, wherein the fillers are present in a quantity in the range from 10 to 30% by weight, relative to the total weight of the polypropylene and fillers, and wherein the density of said base layer is in the range from about 0.4 to 0.75 g/cm$^3$.

2. The packaging wrapper as claimed in claim 1, which has an edge length in the range from about 7 to 22 cm.

3. The packaging wrapper as claimed in claim 1, which has an edge length in the range from about 13 to 22 cm.

4. The packaging wrapper as claimed in claim 1, wherein the overlap zones in the regions, close to the side edges, of the rear wrapper wall have a width of a few centimeters.

5. The packaging wrapper as claimed in claim 1, wherein the overlap zones in the regions, close to the side edges, of the rear wrapper wall have a width of from about 0.5 to 3 cm.

6. The packaging wrapper as claimed in claim 1, wherein a projection of the rear wrapper wall protrudes beyond the wrapper opening.

7. The packaging wrapper as claimed in claim 6, wherein the projection of the rear wrapper wall has a length in the range from about 1 to 5 cm and tapers pointing away from the wrapper opening.

8. The packaging wrapper as claimed in claim 1, wherein the base layer of the film forming the packaging wrapper has a density in the range from about 0.4 to 0.6 g/cm$^3$.

9. The packaging wrapper as claimed in claim 1, wherein the filler added to the base layer has a mean particle size in the range from about 2 to 5 $\mu$m.

10. The packaging wrapper as claimed in claim 1, wherein the quantity of filler in the base layer is in the range from about 10 to 20% by weight.

11. The packaging wrapper as claimed in claim 10, wherein the fillers are inorganic or organic inert fillers.

12. The packaging wrapper as claimed in claim 1, wherein the base layer additionally comprises color pigments in quantities from about 0.01 to 2% by weight.

13. The packaging wrapper as claimed in claim 12, wherein the base layer comprises from about 0.04 to 1% by weight of carbon black particles.

14. The packaging wrapper as claimed in claim 1, wherein the total thickness of said multi-ply film forming the packaging wrapper is in the range from about 20 to 120 $\mu$m.

15. The packaging wrapper as claimed in claim 1, wherein the total thickness of said multi-ply film forming the packaging wrapper is in the range from about 40 to 80 $\mu$m.

16. The packaging wrapper as claimed in claim 1, wherein the surface layers of said multi-ply film forming the packaging wrapper are sealable layers.

17. The packaging wrapper as claimed in claim 1, further comprising surface layers on both sides of said base layer, wherein the thickness of said surface layers is in the range from about 0.1 to 10 m.

18. The packaging wrapper as claimed in claim 1, wherein the thickness of said surface layers is in the range from about 0.5 to 2 $\mu$m.

19. The packaging wrapper as claimed in claim 1, additionally comprising a metallization layer.

20. The packaging wrapper as claimed in claim 19, wherein said metallization layer comprises aluminum applied by vacuum vapor-deposition.

21. The packaging wrapper as claimed in claim 19, wherein said metallization layer is on the inside of the packaging wrapper.

22. The packaging wrapper as claimed in claim 19, wherein the insides of both the front wrapper wall and of the rear wrapper wall as well as the projection of the rear wrapper wall comprise a metallization layer.

23. The packaging wrapper as claimed in claim 1, additionally comprising an imprint on an outer surface of said wrapper.

24. The packaging wrapper as claimed in claim 6, additionally comprising an imprint on the outer surface of said front wrapper wall, the outer surface of said rear wrapper wall and the outer surface of said projection of the rear wrapper wall.

25. The packaging wrapper as claimed in claim 23, additionally comprising a protective film of polyethylene or polypropylene coated on said imprint.

* * * * *